(12) United States Patent
Jacobson et al.

(10) Patent No.: US 8,129,655 B2
(45) Date of Patent: Mar. 6, 2012

(54) ELECTROPHORETIC MEDIUM WITH GASEOUS SUSPENDING FLUID

(75) Inventors: Joseph M. Jacobson, Newton Centre, MA (US); Thomas H. Whitesides, Somerville, MA (US); Robert W. Zehner, Arlington, MA (US)

(73) Assignee: E Ink Corporation, Cambridge, MA (US)

( * ) Notice: Subject to any disclaimer, the term of this patent is extended or adjusted under 35 U.S.C. 154(b) by 1524 days.

(21) Appl. No.: 10/605,039

(22) Filed: Sep. 3, 2003

(65) Prior Publication Data

US 2004/0112750 A1    Jun. 17, 2004

Related U.S. Application Data

(60) Provisional application No. 60/319,517, filed on Sep. 3, 2002.

(51) Int. Cl.
*B23K 10/00* (2006.01)

(52) U.S. Cl. .............................. 219/121.39; 219/121.48

(58) Field of Classification Search ............. 219/121.54, 219/121.57, 121.39, 124.34, 121.44, 121.48, 219/121.59, 75, 137.63, 121.4, 121.43, 121.52; 204/601, 606; 428/400.24; 388/16–18, 901, 388/63; 345/31, 107
See application file for complete search history.

(56) References Cited

U.S. PATENT DOCUMENTS

| | | | |
|---|---|---|---|
| 3,668,106 A | 6/1972 | Ota | 358/305 |
| 3,756,693 A | 9/1973 | Ota | 345/107 |
| 3,767,392 A | 10/1973 | Ota | 430/35 |
| 3,792,308 A | 2/1974 | Ota | 315/150 |
| 3,870,517 A | 3/1975 | Ota et al. | 430/38 |
| 3,892,568 A | 7/1975 | Ota | 430/19 |
| 4,418,346 A | 11/1983 | Batchelder | 340/787 |
| 4,643,854 A | 2/1987 | Kendall, Jr. et al. | 264/12 |
| 4,960,351 A | 10/1990 | Kendall, Jr. et al. | 425/6 |
| 5,582,700 A | 12/1996 | Bryning et al. | 204/450 |
| 5,724,187 A | 3/1998 | Varaprasad et al. | 359/608 |
| 5,745,094 A | 4/1998 | Gordon, II et al. | 345/107 |
| 5,760,761 A | 6/1998 | Sheridon | 345/107 |
| 5,777,782 A | 7/1998 | Sheridon | 359/296 |
| 5,808,783 A | 9/1998 | Crowley | 359/296 |
| 5,872,552 A | 2/1999 | Gordon, II et al. | 345/107 |
| 5,930,026 A | 7/1999 | Jacobson et al. | 359/296 |
| 5,959,777 A | 9/1999 | Whitehead | 359/618 |
| 5,961,804 A | 10/1999 | Jacobson et al. | 204/606 |

(Continued)

FOREIGN PATENT DOCUMENTS

EP    1 145 072 B1    5/2003

(Continued)

OTHER PUBLICATIONS

Amundson, K., et al., "Flexible, Active-Matrix Display Constructed Using a Microencapsulated Electrophoretic Material and an Organic-Semiconductor-Based Backplane", SID 01 Digest, 160 (Jun. 2001).

(Continued)

*Primary Examiner* — Mark Paschall
(74) *Attorney, Agent, or Firm* — David J. Cole (57) ABSTRACT

An electrophoretic medium (102) comprises a plurality of capsules (104), each capsule comprising an internal phase comprising a plurality of electrophoretically mobile particles (106, 108) in a gaseous suspending medium, and a capsule wall surrounding the internal phase. Various processes for producing such an electrophoretic medium are also described.

8 Claims, 3 Drawing Sheets

U.S. PATENT DOCUMENTS

| | | | |
|---|---|---|---|
| 5,999,307 A | 12/1999 | Whitehead et al. | 359/298 |
| 6,017,584 A | 1/2000 | Albert et al. | 427/213.3 |
| 6,054,071 A | 4/2000 | Mikkelsen, Jr. | 264/1.36 |
| 6,055,091 A | 4/2000 | Sheridon et al. | 359/296 |
| 6,064,784 A | 5/2000 | Whitehead et al. | 385/18 |
| 6,067,185 A | 5/2000 | Albert et al. | 359/296 |
| 6,097,531 A | 8/2000 | Sheridon | 359/296 |
| 6,118,426 A | 9/2000 | Albert et al. | 345/107 |
| 6,120,588 A | 9/2000 | Jacobson | 106/31.16 |
| 6,120,839 A | 9/2000 | Comiskey et al. | 427/213.3 |
| 6,124,851 A | 9/2000 | Jacobson | 345/206 |
| 6,128,124 A | 10/2000 | Silverman | 359/296 |
| 6,130,773 A | 10/2000 | Jacobson et al. | 359/296 |
| 6,130,774 A | 10/2000 | Albert et al. | 359/296 |
| 6,137,467 A | 10/2000 | Sheridon et al. | 345/107 |
| 6,144,361 A | 11/2000 | Gordon, II et al. | 345/107 |
| 6,147,791 A | 11/2000 | Sheridon | 359/296 |
| 6,172,798 B1 | 1/2001 | Albert et al. | 359/296 |
| 6,177,921 B1 | 1/2001 | Comiskey et al. | 345/107 |
| 6,184,856 B1 | 2/2001 | Gordon, II et al. | 345/107 |
| 6,215,920 B1* | 4/2001 | Whitehead et al. | 385/18 |
| 6,225,971 B1 | 5/2001 | Gordon, II et al. | 345/107 |
| 6,232,950 B1 | 5/2001 | Albert et al. | 345/107 |
| 6,241,921 B1 | 6/2001 | Jacobson et al. | 264/1.36 |
| 6,243,058 B1 | 6/2001 | Mikkelsen et al. | 345/84 |
| 6,249,271 B1 | 6/2001 | Albert et al. | 345/107 |
| 6,252,564 B1 | 6/2001 | Albert et al. | 345/1.3 |
| 6,262,706 B1 | 7/2001 | Albert et al. | 345/107 |
| 6,262,833 B1 | 7/2001 | Loxley et al. | 359/296 |
| 6,266,177 B1 | 7/2001 | Allemand et al. | 359/265 |
| 6,271,823 B1 | 8/2001 | Gordon, II et al. | 345/107 |
| 6,294,063 B1* | 9/2001 | Becker et al. | 204/450 |
| 6,300,932 B1 | 10/2001 | Albert | 345/107 |
| 6,301,038 B1 | 10/2001 | Fitzmaurice et al. | 359/265 |
| 6,304,365 B1 | 10/2001 | Whitehead | 359/296 |
| 6,312,304 B1 | 11/2001 | Duthaler et al. | 445/24 |
| 6,312,971 B1 | 11/2001 | Amundson et al. | 438/99 |
| 6,323,989 B1 | 11/2001 | Jacobson et al. | 359/296 |
| 6,327,072 B1 | 12/2001 | Comiskey et al. | 359/296 |
| 6,376,828 B1 | 4/2002 | Comiskey | 250/216 |
| 6,377,383 B1 | 4/2002 | Whitehead et al. | 359/222 |
| 6,377,387 B1 | 4/2002 | Duthaler et al. | 359/296 |
| 6,392,785 B1 | 5/2002 | Albert et al. | 359/296 |
| 6,392,786 B1 | 5/2002 | Albert | 359/296 |
| 6,407,763 B1 | 6/2002 | Yamaguchi et al. | 347/112 |
| 6,413,790 B1 | 7/2002 | Duthaler et al. | 438/21 |
| 6,422,687 B1 | 7/2002 | Jacobson | 347/55 |
| 6,445,374 B2 | 9/2002 | Albert et al. | 345/107 |
| 6,445,489 B1 | 9/2002 | Jacobson et al. | 359/296 |
| 6,459,418 B1 | 10/2002 | Comiskey et al. | 345/107 |
| 6,473,072 B1 | 10/2002 | Comiskey et al. | 345/173 |
| 6,480,182 B2 | 11/2002 | Turner et al. | 345/107 |
| 6,498,114 B1 | 12/2002 | Amundson et al. | 438/780 |
| 6,504,524 B1 | 1/2003 | Gates et al. | 345/107 |
| 6,506,438 B2 | 1/2003 | Duthaler et al. | 427/58 |
| 6,512,354 B2 | 1/2003 | Jacobson et al. | 324/71.1 |
| 6,515,649 B1 | 2/2003 | Albert et al. | 345/107 |
| 6,515,790 B2 | 2/2003 | Miyamoto | 359/296 |
| 6,518,949 B2 | 2/2003 | Drzaic | 345/107 |
| 6,521,489 B2 | 2/2003 | Duthaler et al. | 438/149 |
| 6,531,997 B1 | 3/2003 | Gates et al. | 345/107 |
| 6,535,197 B1 | 3/2003 | Comiskey et al. | 345/107 |
| 6,538,801 B2 | 3/2003 | Jacobson et al. | 359/296 |
| 6,545,291 B1 | 4/2003 | Amundson et al. | 257/40 |
| 6,580,545 B2 | 6/2003 | Morrison et al. | 359/265 |
| 6,636,186 B1* | 10/2003 | Yamaguchi et al. | 345/31 |
| 6,639,578 B1 | 10/2003 | Comiskey et al. | 345/107 |
| 6,652,075 B2 | 11/2003 | Jacobson | 347/55 |
| 6,657,772 B2 | 12/2003 | Loxley | 359/296 |
| 6,664,944 B1 | 12/2003 | Albert et al. | 345/107 |
| D485,294 S | 1/2004 | Albert | D18/26 |
| 6,672,921 B1 | 1/2004 | Liang et al. | 445/24 |
| 6,680,725 B1 | 1/2004 | Jacobson | 345/107 |
| 6,683,333 B2 | 1/2004 | Kazlas et al. | 257/197 |
| 6,693,620 B1 | 2/2004 | Herb et al. | 345/107 |
| 6,704,133 B2 | 3/2004 | Gates et al. | 359/296 |
| 6,710,540 B1 | 3/2004 | Albert et al. | 313/498 |
| 6,721,083 B2 | 4/2004 | Jacobson et al. | 359/296 |
| 6,724,519 B1 | 4/2004 | Comiskey et al. | 359/296 |
| 6,727,881 B1 | 4/2004 | Albert et al. | 345/107 |
| 6,738,050 B2 | 5/2004 | Comiskey et al. | 345/173 |
| 6,750,473 B2 | 6/2004 | Amundson et al. | 257/40 |
| 6,753,999 B2 | 6/2004 | Zehner et al. | 359/296 |
| 6,816,147 B2 | 11/2004 | Albert | 345/107 |
| 6,819,471 B2 | 11/2004 | Amundson et al. | 359/296 |
| 6,822,782 B2 | 11/2004 | Honeyman et al. | 359/296 |
| 6,825,068 B2 | 11/2004 | Denis et al. | 438/149 |
| 6,825,829 B1 | 11/2004 | Albert et al. | 345/107 |
| 6,825,970 B2 | 11/2004 | Goenaga et al. | 359/296 |
| 6,831,769 B2 | 12/2004 | Holman et al. | 359/296 |
| 6,839,158 B2 | 1/2005 | Albert et al. | 359/296 |
| 6,842,167 B2 | 1/2005 | Albert et al. | 345/107 |
| 6,842,279 B2 | 1/2005 | Amundson | 359/296 |
| 6,842,657 B1 | 1/2005 | Drzaic et al. | 700/120 |
| 2001/0046081 A1* | 11/2001 | Hayashi et al. | 359/296 |
| 2002/0051280 A1 | 5/2002 | Matsunaga et al. | 359/296 |
| 2002/0060321 A1 | 5/2002 | Kazlas et al. | 257/66 |
| 2002/0063661 A1 | 5/2002 | Comiskey et al. | 345/55 |
| 2002/0075556 A1 | 6/2002 | Liang et al. | 359/296 |
| 2002/0090980 A1 | 7/2002 | Wilcox et al. | 455/566 |
| 2002/0113770 A1 | 8/2002 | Jacobson et al. | 345/107 |
| 2002/0113871 A1 | 8/2002 | Sakamaki et al. | 348/106 |
| 2002/0130832 A1 | 9/2002 | Baucom et al. | 345/107 |
| 2002/0131147 A1 | 9/2002 | Paolini, Jr. et al. | 359/296 |
| 2002/0171910 A1 | 11/2002 | Pullen et al. | 359/296 |
| 2002/0180687 A1 | 12/2002 | Webber | 345/107 |
| 2002/0180688 A1 | 12/2002 | Drzaic et al. | 345/107 |
| 2002/0196207 A1 | 12/2002 | Machida et al. | 345/55 |
| 2002/0196219 A1 | 12/2002 | Matsunaga et al. | 345/87 |
| 2003/0011560 A1 | 1/2003 | Albert et al. | 345/107 |
| 2003/0020844 A1 | 1/2003 | Albert et al. | 349/33 |
| 2003/0043315 A1 | 3/2003 | Yamamoto et al. | 349/167 |
| 2003/0063076 A1 | 4/2003 | Machida et al. | 345/204 |
| 2003/0099027 A1 | 5/2003 | Shigehiro et al. | 359/296 |
| 2003/0102858 A1 | 6/2003 | Jacobson et al. | 324/158.1 |
| 2003/0132908 A1 | 7/2003 | Herb et al. | 345/107 |
| 2003/0137521 A1 | 7/2003 | Zehner et al. | 345/589 |
| 2003/0151702 A1 | 8/2003 | Morrison et al. | 349/25 |
| 2003/0174385 A1 | 9/2003 | Liang et al. | 359/296 |
| 2003/0179436 A1 | 9/2003 | Liang et al. | 359/296 |
| 2003/0206329 A1* | 11/2003 | Ikeda et al. | 359/296 |
| 2003/0214695 A1 | 11/2003 | Abramson et al. | 359/265 |
| 2003/0214697 A1 | 11/2003 | Duthaler et al. | 359/296 |
| 2003/0222315 A1 | 12/2003 | Amundson et al. | 257/368 |
| 2004/0012839 A1 | 1/2004 | Cao et al. | 359/296 |
| 2004/0014265 A1 | 1/2004 | Kazlas et al. | 438/200 |
| 2004/0027327 A1 | 2/2004 | LeCain et al. | 345/107 |
| 2004/0075634 A1 | 4/2004 | Gates | 345/99 |
| 2004/0094422 A1 | 5/2004 | Pullen et al. | 204/600 |
| 2004/0105036 A1 | 6/2004 | Danner et al. | 348/748 |
| 2004/0119681 A1 | 6/2004 | Albert et al. | 345/107 |
| 2004/0155857 A1 | 8/2004 | Duthaler et al. | 345/107 |
| 2004/0182711 A1* | 9/2004 | Liang et al. | 204/606 |
| 2006/0038772 A1* | 2/2006 | Amundson et al. | 345/107 |
| 2006/0202949 A1* | 9/2006 | Danner et al. | 345/107 |

FOREIGN PATENT DOCUMENTS

| | | |
|---|---|---|
| JP | 01-105785 | 4/1989 |
| JP | 2002-139751 | 5/2002 |
| JP | 2004-046072 | 2/2004 |
| WO | WO 00/05704 | 2/2000 |
| WO | WO 00/36560 | 6/2000 |
| WO | WO 00/38000 | 6/2000 |
| WO | WO 00/67110 | 11/2000 |
| WO | WO 00/67327 | 11/2000 |
| WO | WO 01/02899 | 1/2001 |
| WO | WO 01/07961 | 2/2001 |
| WO | WO 01/27690 | 4/2001 |

OTHER PUBLICATIONS

Bach, U., et al., "Nanomaterials-Based Electrochromics for Paper-Quality Displays", Adv. Mater, 14(11), 845 (2002).

Chen, Y., et al., "A Conformable Electronic Ink Display using a Foil-Based a-Si TFT Array", SID 01 Digest, 157 (Jun. 2001).

Comiskey, B., et al., "An electrophoretic ink for all-printed reflective electronic displays", Nature, 394, 253 (1998).

Comiskey, B., et al., "Electrophoretic Ink: A Printable Display Material", SID 97 Digest (1997), p. 75.

Drzaic, P., et al., "A Printed and Rollable Bistable Electronic Display", SID 98 Digest (1998), p. 1131.

Duthaler, G., et al., "Active-Matrix Color Displays Using Electrophoretic Ink and Color Filters", SID 02 Digest, 1374 (2002).

Jacobson, J., et al., "The last book", IBM Systems J., 36, 457 (1997).

Kazlas, P., et al., "12.1" SVGA Microencapsulated Electrophoretic Active Matrix Display for Information Applicances, SID 01 Digest, 152 (Jun. 2001).

Kitamura, T., et al., "Electrical toner movement for electronic paper-like display", Asia Display/IDW '01, p. 1517, Paper HCS1-1.

Pitt, M.G., et al., "Power Consumption of Microencapsulated Electrophoretic Displays for Smart Handheld Applications", SID 02 Digest, 1378 (2002).

Webber, R., "Image Stability in Active-Matrix Microencapsulated Electrophoretic Displays", SID 02 Digest, 126 (2002).

Yamaguchi, Y., et al., "Toner display using insulative particles charged triboelectrically", Asia Display/IDW '01, p. 1729, Paper AMD4-4.

Jo, G-R, et al., "Toner Display Based on Particle Movements", Chem. Mater, 14, 664 (2002).

* cited by examiner

ELECTROPHORETIC MEDIUM WITH GASEOUS SUSPENDING FLUID

CROSS REFERENCE TO RELATED APPLICATIONS

This invention claims priority from Provisional Application Ser. No. 60/319,517, filed Sep. 3, 2002. The entire disclosure of this application, and of all other patents and applications referred to below, is herein incorporated by reference.

BACKGROUND OF INVENTION

This invention relates to an electrophoretic medium with a gaseous suspending fluid. More specifically, this invention relates to an encapsulated electrophoretic medium with a gaseous suspending fluid.

Electrophoretic displays have been the subject of intense research and development for a number of years. Such displays can have attributes of good brightness and contrast, wide viewing angles, state bistability, and low power consumption when compared with liquid crystal displays. (The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element.) Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically mobile particles suspended in a liquid suspension medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,721; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; and 6,580,545; and U.S. Patent Applications Publication Nos. 2002/0019081; 2002/0021270; 2002/0053900; 2002/0060321; 2002/0063661; 2002/0063677; 2002/0090980; 2002/0106847; 2002/0113770; 2002/0130832; 2002/0131147; 2002/0145792; 2002/0171910; 2002/0180687; 2002/0180688; 2002/0185378; 2003/0011560; 2003/0011867; 2003/0011868; 2003/0020844; 2003/0025855; 2003/0034949; 2003/0038755; 2003/0053189; 2003/0076573; 2003/0096113; 2003/0102858; 2003/0132908; 2003/0137521; and 2003/0137717; and International Applications Publication Nos. WO 99/67678; WO 00/05704; WO 00/38000; WO 00/38001; WO 00/36560; WO 00/67110; WO 00/67327; WO 01/07961; and WO 01/08241.

Known electrophoretic media, both encapsulated and unencapsulated, can be divided into two main types, referred to hereinafter for convenience as "single particle" and "dual particle" respectively. A single particle medium has only a single type of electrophoretic particle suspending in a colored suspending medium, at least one optical characteristic of which differs from that of the particles. (In referring to a single type of particle, we do not imply that all particles of the type are absolutely identical. For example, provided that all particles of the type possess substantially the same optical characteristic and a charge of the same polarity, considerable variation in parameters such as particle size and electrophoretic mobility can be tolerated without affecting the utility of the medium.) The optical characteristic is typically color visible to the human eye, but may, alternatively or in addition, be any one of more of reflectivity, retroreflectivity, luminescence, fluorescence, phosphorescence, or color in the broader sense of meaning a difference in absorption or reflectance at non-visible wavelengths. When such a medium is placed between a pair of electrodes, at least one of which is transparent, depending upon the relative potentials of the two electrodes, the medium can display the optical characteristic of the particles (when the particles are adjacent the electrode closer to the observer, hereinafter called the "front" electrode) or the optical characteristic of the suspending medium (when the particles are adjacent the electrode remote from the observer, hereinafter called the "rear" electrode, so that the particles are hidden by the colored suspending medium).

A dual particle medium has two different types of particles differing in at least one optical characteristic and a suspending fluid which may be uncolored or colored, but which is typically uncolored. The two types of particles differ in electrophoretic mobility; this difference in mobility may be in polarity (this type may hereinafter be referred to as an "opposite charge dual particle" medium) and/or magnitude. When such a dual particle medium is placed between the aforementioned pair of electrodes, depending upon the relative potentials of the two electrodes, the medium can display the optical characteristic of either set of particles, although the exact manner in which this is achieved differs depending upon whether the difference in mobility is in polarity or only in magnitude. For ease of illustration, consider an electrophoretic medium in which one type of particles is black and the other type white. If, the two types of particles differ in polarity (if, for example, the black particles are positively charged and the white particles negatively charged), the particles will be attracted to the two different electrodes, so that if, for example, the front electrode is negative relative to the rear electrode, the black particles will be attracted to the front electrode and the white particles to the rear electrode, so that the medium will appear black to the observer. Conversely, if the front electrode is positive relative to the rear electrode, the white particles will be attracted to the front electrode and the black particles to the rear electrode, so that the medium will appear white to the observer.

If the two types of particles have charges of the same polarity, but differ in electrophoretic mobility (this type of medium may hereinafter to referred to as a "same polarity dual particle" medium), both types of particles will be attracted to the same electrode, but one type will reach the electrode before the other, so that the type facing the observer differs depending upon the electrode to which the particles are attracted. For example suppose the previous illustration is modified so that both the black and white particles are positively charged, but the black particles have the higher electrophoretic mobility. If now the front electrode is negative relative to the rear electrode, both the black and white particles will be attracted to the front electrode, but the black particles, because of their higher mobility will reach it first, so that a layer of black particles will coat the front electrode and the medium will appear black to the observer. Conversely, if the front electrode is positive relative to the rear electrode, both the black and white particles will be attracted to the rear electrode, but the black particles, because of their higher mobility will reach it first, so that a layer of black particles will coat the rear electrode, leaving a layer of white particles remote from the rear electrode and facing the observer, so that the medium will appear white to the observer: note that this type of dual particle medium requires that the suspending fluid to sufficiently transparent to allow the layer of white particles remote from the rear electrode to be readily visible to the observer. Typically, the suspending fluid in a dual particle display is not colored at all, but some color may be incorporated for the purpose of correcting any undesirable tint in the white particles seen therethrough.

Some of the aforementioned patents and published applications disclose encapsulated electrophoretic media having three or more different types of particles within each capsule. For purposes of the present application, such multi-particle media are regarded as sub-species of dual particle media.

Also, many of the aforementioned patents and applications recognize that the walls surrounding the discrete microcapsules in an encapsulated electrophoretic medium could be replaced by a continuous phase, thus producing a so-called "polymer-dispersed electrophoretic display" in which the electrophoretic medium comprises a plurality of discrete droplets of an electrophoretic fluid and a continuous phase of a polymeric material, and the discrete droplets of electrophoretic fluid within such a polymer-dispersed electrophoretic display may be regarded as capsules or microcapsules even though no discrete capsule membrane is associated with each individual droplet; see for example, the aforementioned 2002/0131147.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; and other similar techniques.) Thus, the resulting display can be flexible. Further, because the display medium can be printed using a variety of methods, the display itself can be made inexpensively. Present day electrophoretic displays exhibit paper-like reflective optics, extremely low power consumption due to retained image capability, and mechanical conformability and flexibility.

All of the aforementioned types of electrophoretic media require the presence of a suspending fluid. In all the specific embodiments discussed in the aforementioned patents and applications, this suspending fluid is a liquid, but there is no reason why encapsulated electrophoretic media should not be produced using gaseous suspending fluids. Unencapsulated electrophoretic media using gaseous suspending fluids are known (see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4) and such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

SUMMARY OF INVENTION

Accordingly, this invention provides an electrophoretic medium comprising a plurality of capsules, each capsule comprising an internal phase comprising a plurality of electrophoretically mobile particles in a gaseous suspending medium, and a capsule wall surrounding the internal phase.

In one form of such an electrophoretic medium, each capsule comprises a single type of electrophoretically mobile particle, each capsule having a pair of opposed surfaces differing in size. In a second form of such an electrophoretic medium, there are two types of particles having differing optical characteristics and differing electrophoretic mobilities. One type of particle may have substantially zero electrophoretic mobility. Alternatively, the two types of particles may bear charges of the same polarity but differ in electrophoretic mobility.

The electrophoretic medium of the present invention may be of the polymer-dispersed type described above; thus the capsule walls of a plurality of capsules may be merged with one another, so that the medium comprises a plurality of bubbles, each containing the electrophoretically mobile particles and the gaseous suspending medium, the bubbles being dispersed in a continuous solid phase.

For reasons described below, one preferred gaseous suspending medium for use in the present invention comprises carbon dioxide.

This invention extends to an electrophoretic display comprising an electrophoretic medium of the invention and at least one electrode disposed adjacent the electrophoretic medium and arranged to apply an electric field to the medium.

This invention also provides a first process for producing an electrophoretic medium of the invention. This first process comprises forming a medium comprising a plurality of capsules, each capsule comprising an internal phase comprising a plurality of particles in a liquid suspending medium, and a capsule wall surrounding the internal phase; and replacing the liquid suspending medium with a gaseous suspending medium. In this process, the replacement of the liquid suspending medium may be effected by evaporating the liquid suspending medium while diffusing a gaseous suspending medium into the capsules. Also in this process, the formation of the medium comprising the liquid suspending medium may be effected by forming a plurality of droplets, each comprising the liquid suspending medium and the particles, in a continuous phase comprising a curable binder, and thereafter at least partially curing the curable binder.

This invention also provides a second process for producing an electrophoretic medium of the invention. This second process comprises admixing particles with a material capable of generating gas; dispersing the mixture of particles and gas-generating material in a curable binder; at least partially curing the binder; and exposing the gas-generating material to conditions effective to cause generation of gas therefrom, thereby causing the formation within the binder of capsules containing the particles. In this process, the gas-generating material may comprise a volatile liquid and the gas be formed by evaporation of the liquid. Alternatively, the gas may be generated by reaction of the gas-generating material with a material present in the binder.

This invention also provides a third process for producing an electrophoretic medium of the invention. This third process comprises admixing a material capable of generating gas with a wall-forming material; exposing the gas-generating material to conditions effective to cause generation of gas therefrom, thereby causing the formation of gas-filled cavities within the wall-forming material; and introducing solid particles into the cavities.

Finally, this invention provides a fourth process for producing an electrophoretic medium of the invention. This fourth process comprises admixing particles with a supercritical fluid; surrounding the mixture of particles and supercritical fluid with a capsule wall, thereby forming a capsule; and reducing the pressure on the capsule below the critical pressure of the supercritical fluid, thereby causing the supercritical fluid to form a gaseous suspending medium within the capsule. In this fourth process, the surrounding of the mixture of particles and supercritical fluid with a capsule wall may be effected by forming a droplet of the mixture in a curable binder, and at least partially curing the binder before reducing the pressure below the critical pressure. Alternatively, the surrounding of the mixture of particles and supercritical fluid with a capsule wall may be effected by forming a droplet of the mixture in a liquid phase immiscible with the supercritical fluid, and forming the capsule at the interface between the supercritical fluid and the liquid phase. The preferred supercritical fluid for use in this process is carbon dioxide. The process may include the additional step of replacing the gaseous suspending fluid formed from the supercritical fluid with a different gaseous suspending medium.

DETAILED DESCRIPTION

The aforementioned Kitamura paper describes an electrophoretic imaging system based on particles moving in air under the influence of a field. A transition between black and white optical states is achieved with a switching time of about one millisecond. The electrophoretic particles comprise a black, conductive polymeric bead, which can be reversibly charged by contact with a charge transfer layer (a mixture of a polycarbonate and (N,N-diethylamino)benzaldehyde diphenyl hydrazone, coated in a 1:1 weight ratio) on indium tin oxide (ITO) coated glass. Depending on the polarity of the applied voltage, the charged particles are either visible (black state) or hidden behind a non-charging cloud of white particles (white state) composed of a material denoted "carbon fluoride". The operating voltage is greater than 100 V, and the optical contrast ratio is only about 2. However, the aforementioned Yamaguchi paper, which describes a system in which the electrophoretic particles are tribocharged particles, suggests that with air as the medium, a threshold may be observed below which the medium does not switch optical states, so that passive-matrix addressing may be possible.

While in principle encapsulated gas-based electrophoretic media may be of any of the types discussed above with reference to encapsulated liquid-based electrophoretic media, the use of gas as a suspending fluid does impose certain practical limitations. For example, it is highly unlikely that a gas phase can be colored to a sufficiently high optical density to produce a satisfactory single particle gas-based medium using essentially spherical capsules, although we do not exclude such a possibility. Hence, a dual particle approach is primarily indicated for a gas-based medium. However, an opposite charge dual particle gas-based system also presents problems. For example, an opposite charge dual particle gas-based system of the type described in the aforementioned Kitamura paper (hereinafter for convenience referred to as a "Kitamura display") would require that the conductive particles accept charge from one side on polarization of the medium, so that the conductive particles become charged, are repelled from the electrode from which charge is accepted, and migrate to the opposite electrode. If the conductive particles can readily acquire a charge (of opposite polarity to that previously received) at the second electrode, the conductive particles will simply oscillate between the two electrodes, and the display will not function. Accordingly, maintenance of stable charges on the electrophoretic particles in a Kitamura display requires that the charge transport layer transport either holes or electrons, but not both, so that the particles can acquire charges at only one of the two electrodes. This implies that one cannot make an opposite charge dual particle display of the Kitamura type, since charging of both types of particles would require hole transport at one electrode and electron transport at the other. Accordingly, at least in a Kitamura display, the charging scheme for the particles should be either same polarity dual particle or (as in the actual device described in the Kitamura paper) a dual particle scheme in which one of the types of particles is charged and the other is uncharged; the latter scheme is of course an extreme type of the former, in which the electrophoretic mobility of one type of particle is reduced to zero.

Although a simple single particle gas-based system appears impracticable because of the difficulty of providing a gaseous suspending fluid with sufficient optical density, a single particle gas-based system could be formed in the manner described in the aforementioned U.S. Pat. Nos. 6,130,774 and 6,172,798. These patents describe encapsulated electrophoretic media in which the capsules are "tapered", having one end substantially large than the other; the capsules may have, for example, the form of triangular prisms or pyramids. The contrast between the two optical states of such a display is produced by the differing areas occupied by the electrophoretic particles when they are moved to the opposed ends of the capsules. Assume that the electrophoretic particles are black and that the walls of the capsules are arranged to appear white; for example, the capsules may be disposed within triangular prismatic grooves cut in a white substrate. When the black electrophoretic particles occupy the wide ends of the capsules (which together cover substantially the whole area of the display), the display appears black, while when the electrophoretic particles occupy the narrow ends of the capsules, the white walls are uncovered and the display appears essentially white to an observer.

Although the type of display does require a somewhat complex method of manufacture (discussed in more detail below), including the need for accurate formation of the shaped capsules, it may have advantages with respect to white state and possibly contrast ratio because of improved scattering and because of the existence of a low refractive index interface above the scattering centers.

A change from a liquid-based encapsulated electrophoretic medium to a gas-based one will typically require changes in the processes used to produce the encapsulated medium. In the aforementioned E Ink and MIT patents and applications, liquid-based microcapsules are typically produced by forming a dispersion of the electrophoretic particles in the liquid suspending fluid (which is normally a hydrocarbon, alone or in admixture with a halocarbon). This dispersion then flows, under high shear conditions, into a immiscible liquid containing a precursor of the material which will form the capsule wall. The high shear conditions cause the dispersion to form small droplets within the immiscible liquid, and coacervation of the wall material takes place around these droplets to form the capsules. A curing agent may be added to increase the mechanical strength of the capsule walls so produced.

An exactly parallel process is unlikely to be satisfactory in a gas-based medium, although a somewhat similar process is possible using a supercritical fluid, as described in detail below. While it may be possible to form a dispersion of the electrophoretic particles in a gas, maintaining the resultant bubbles in stable form for a period sufficient to permit coacervation of a capsule wall around the bubble is highly problematic. Furthermore, the particles trapped within a bubble are likely to be in contact with the walls of the bubble, and hence to be stuck to the capsule wall and immobile, resulting in a non-functional medium. Also, coacervation is more difficult at a liquid/gas interface than at a liquid/liquid interface.

Some of the processes described in the aforementioned U.S. Pat. No. 6,377,387 may be adapted for use in the production of gas-based encapsulated electrophoretic media. For example, FIG. 5 of this patent and the related description describe a process in which an internal phase comprising electrophoretic particles and a suspending fluid is dispensed through a central first nozzle, and a capsule-forming material is dispensed through a second, annular nozzle surrounding the central nozzle, the nozzles being vibrated to form complex droplets of the internal phase surrounded by the capsule-forming material. This type of process could be employed to produce gas-based electrophoretic media by substituting a gaseous internal phase and using a capsule-forming material which could be cured very rapidly, for example by ultra-violet curing of a resin, thus enabling the capsule walls to be cured as the bubbles emerge from the compound nozzle. However, sticking of the electrophoretic particles to the capsule walls is still likely to be a problem.

Given that the mechanical fragility of a capsule wall surrounding a compressible gaseous internal phase is likely to be much greater than that of a capsule wall surrounding a relatively incompressible liquid internal phase, and the mechanical difficulties of handling capsules with fragile walls, the optimum approach to forming a gas-based encapsulated electrophoretic medium is in most cases to use a polymer-dispersed medium, in which discrete gas-filled bubbles containing the electrophoretic particles are surrounded by a continuous solid phase binder. Several possible approaches may be useful:

1. Formation of polymer-dispersed liquid phase and replacement of the liquid with gas. The electrophoretic particles are dispersed in a volatile phase, which is then formed into droplets in a binder precursor, the droplets/binder precursor mixture formed into a thin layer, and the binder cured until it is relatively rigid but still permeable to the internal volatile liquid. The liquid is then slowly evaporated from the droplets, and, to prevent collapse of the structure, air or another gas is diffused into the medium to replace the liquid. Alternatively, the liquid could be extracted from the medium using a supercritical fluid, in a manner analogous to that used in the preparation of aerogels. Final curing of the binder may take place after replacement of the volatile liquid with gas.

2. Dispersion of electrophoretic particles in continuous phase followed by in situ generation of gas. The electrophoretic particles are admixed with a material which, alone or in combination with a component of the binder, can generate a gas. The mixture of the electrophoretic particles and the gas-generating material is dispersed in a binder precursor and the resultant mixture formed into a thin layer and the binder partially cured in the same way as in 1 above. Simultaneously with this process, or thereafter, gas is generated to form bubbles within which are located the electrophoretic particles.

Several variations of this approach are possible. For example, the electrophoretic particles could be slurried in a small quantity of a volatile liquid which, within the binder, could be converted to a gas by heating or reduction of pressure. Examples of such volatile liquids could include small hydrocarbon or halocarbon gases, noble gases, or other inert gaseous material; in these cases, the dispersion and slurry preparation would be carried out under sufficient pressure or at sufficiently low temperature that the suspending medium exists in the liquid state. Alternatively, the electrophoretic particles could be mixed with a gas-generating solid, for example an azide, and formed into small pellets which could then be dispersed in the binder precursor. After partial curing of the binder, the gas-generating solid is caused to decompose, for example by heat or radiation, to form gas bubbles within the binder and to liberate the electrophoretic particles within these bubbles.

The gas-generating material may comprise more than one component, and where multiple components are used, these components may be present in the same or different phases. For example, the electrophoretic particles could be dispersed in a liquid mixture of two or more components which react form a gas, and the resultant mixture dispersed within the binder precursor. After partial curing of the binder precursor, the gas-forming reaction could be initiated by, for example, heat or radiation to generate gas bubbles containing the electrophoretic particles. Alternatively, one of the components of the gas generating reaction could be present in the binder precursor and the other as a solid or liquid admixed with the electrophoretic particles. For example, a binder precursor might contain a catalyst which would break down a liquid, in which the electrophoretic particles are dispersed, to form a gas. In a convenient form of such a two component reaction, the binder precursor could be a polyurethane prepolymer and the electrophoretic particles could be dispersed in a liquid phase containing a material containing active hydrogen (for example, water or an alcohol) and/or a blowing agent (the terms "active hydrogen" and "blowing agent" are used in their normal meanings for those skilled in polyurethane technology). Contact of the liquid phase with the polyurethane prepolymer would cause simultaneous formation of bubbles containing the electrophoretic particles and curing of the prepolymer to a polyurethane.

As compared to the "replacement of liquid with gas" approach discussed under 1 above, the use of a gas-generating material has the advantage that collapse of the foam is not a problem.

3. Formation of open cell structure, filling with electrophoretic particles and closure of cells. An open cell structure could be produced using gas-generating pellets as described in 2 above, but without the electrophoretic particles, or using other gas-generating techniques described in 2 above or known in the polymer art. It is desirable that the method chosen produce cells with a regular structure, with walls of uniform height so that sealing of the cells, or closure of the cells by laminating a film across the cells, can readily be achieved. This approach is especially suitable for producing the shaped capsules with differently sized ends discussed above.

4. Use of supercritical fluid. Gas-filled capsules can be produced in the same way as the prior art liquid-filled capsules by carrying out the encapsulation process using a supercritical fluid. A material is said to be supercritical when it is heated above the critical temperature; above this temperature, there is no longer a distinction between liquid and gas phases. There are various advantages to working in this supercritical region. Key materials parameters such as dielectric constant and density can be varied across a wide range by changing the temperature and pressure.

The preferred supercritical fluid for use in this process is carbon dioxide, which has a critical temperature of approximately 31° C. Supercritical carbon dioxide is immiscible with water, and provided the encapsulation procedure is carried out under above this critical temperature and sufficient pressure (at least about 73 atmospheres, or approximately 7.3 mPa) to maintain the density of the carbon dioxide at an appropriate level, the supercritical carbon dioxide will act as a water-immiscible liquid generally similar to the hydrocarbon-based liquids used as suspending fluids in the E Ink and MIT patents and applications mentioned above. Accordingly, under these conditions, the prior art processes previously used for encapsulation of hydrocarbon-based liquid suspending media can also be carried out with supercritical carbon dioxide suspending media. For example, a polyelectrolyte coacervation reaction could be used to encapsulate the supercritical carbon dioxide.

After completion of the encapsulation, the capsules formed can be slowly depressurized above the critical temperature (thus ensuring that is no sudden ebullition which might damage the capsules), and the capsules subsequently lowered to room temperature and pressure to yield capsules containing electrophoretic particles and carbon dioxide gas. Obviously, the depressurization should be carried out at a rate which enables excess carbon dioxide to diffuse out of the capsules, thereby preventing rupture of the capsules during depressurization, but in practice the rate of diffusion of carbon dioxide through most capsule wall materials is sufficient to allow depressurization to proceed without greatly extended processing times. The carbon dioxide remaining in the capsules following depressurization and cooling to room temperature may if desired be exchanged with another gas, conveniently by immersing the capsules in the other gas and allowing the capsules to equilibrate.

The use of supercritical fluids, and especially supercritical carbon dioxide, has environmental advantages. The processes discussed in Section 1. above, which rely upon initial formation of capsules containing a volatile (typically organic) liquid and replacement of this volatile liquid with gas, produce substantial amounts of the vapor of the volatile liquid, which must either be released into the atmosphere or (typically) recovered from a waste gas stream, often at considerable expense. In contrast, a process using supercritical carbon dioxide produces only carbon dioxide gas as a waste product, and normally does not even result in additional production of this gas, since most commercial sources of carbon dioxide use gas recovered from fermentation or fuel combustion, which would otherwise be vented directly to atmosphere.

The use of supercritical fluids is not, of course, confined to the production of discrete capsules and supercritical fluids may also be used in the production of polymer-dispersed electrophoretic media, as discussed in Section 1. above.

There are also several possible approaches to charging the electrophoretic particles in an air-based electrophoretic medium. The particles may be charged triboelectrically, as in the Yamaguchi paper previously mentioned. However, triboelectric charging may not be desirable in a display intended to have long term bistability, since decay of the triboelectric charge is likely to occur over a relatively short time scale. Alternatively, contact charging, using a charge transfer layer, may be employed, as in the Kitamura paper. However, contact charging does introduce complications in the constructions of the cells (bubbles) containing the electrophoretic particles since at least one end surface of each cell must provide a contact charging surface (typically formed of a charging transporting, conductive polymer, while the walls of the cells should be insulating to avoid lateral charge transfer which might degrade the quality of the image produced. Accordingly, if contact charging is to be used, the open cell approach (3 above) to the manufacture of the medium is preferred. Alternatively, charge transport materials could be diffused into one or both end surfaces of cells formed from an otherwise insulating material during the coating or evaporations steps in methods 1 and 2 above.

Thus, the construction of a gas-based encapsulated electrophoretic display could proceed in four basic steps, as follows:

1. A charge transport layer is coated on to a conductive support (for example, an ITO layer) using excess charge transport material.

2. A second layer containing cell-forming materials and electrophoretic particles as described above is coated over the charge transport layer, the coating and curing of this second layer being effected under conditions which allow partial diffusion of the charge transport material into the second layer, but which do not allow the whole layer to become conductive.

3. A third layer is coated containing a diffusible charge transport material, and optionally a volatile plasticizer for the cured second layer.

4A final conductive layer (for example, an ITO layer) is laminated over the third layer. For obvious reasons, one or both of the conductive layers must be transparent.

Exemplary electrophoretic media of the present invention will now be described in detail, though by way of illustration only, with reference to the accompanying drawings.

Figure 1A:
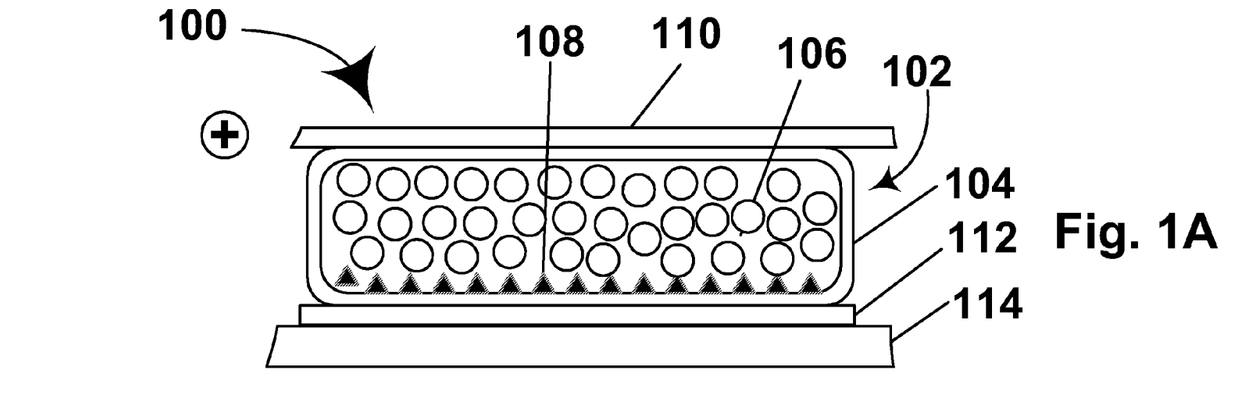
FIGS. 1A and 1B of the accompanying drawings are schematic side elevations showing the two extreme optical states of a dual particle electrophoretic medium of the present invention.
Figure 1B:
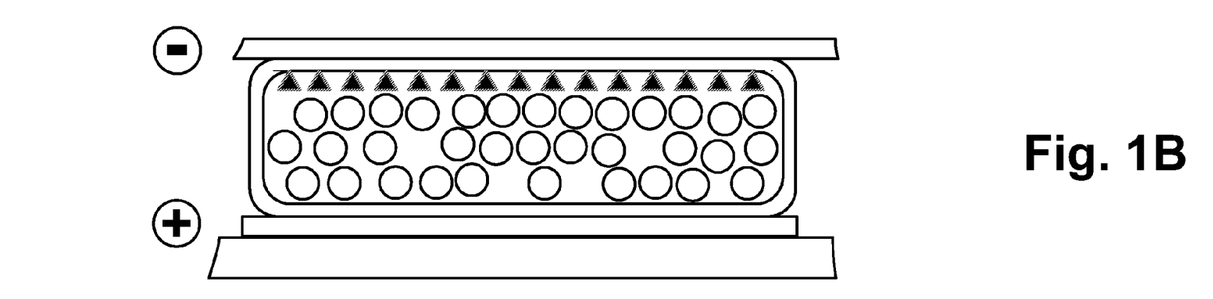

The first electrophoretic display (generally designed 100) of the invention shown in FIGS. 1A and 1B comprises an encapsulated electrophoretic medium (generally designated 102) comprising a plurality of capsules 104 (only one of which is shown in FIGS. 1A and 1B), each of which contains a suspending gas, a large number of uncharged particles 106, which for purposes of illustration will be assumed to be white, and a smaller number of particles 108, which for purposes of illustration will be assumed to be black. The particles 108 are electrophoretically mobile and may be formed of carbon black. In the following description, it will be assumed that the particles 108 are positively charged, although of course negatively charged particles could also be used if desired. (The triangular shape of the particles 108, and the circular shape of the particles 106 are used purely to way of illustration to enable these particles to be distinguished easily in the accompanying drawings, and in no way correspond to the physical forms of the actual particles, which are typically substantially spherical. However, we do not exclude the use of non-spherical particles in the present displays.)

The display 100 further comprises a common, transparent front electrode 110, which forms a viewing surface through which an observer views the display 100, and a plurality of discrete rear electrodes 112, each of which defines one pixel of the display 100 (only one rear electrode 112 is shown in FIGS. 1A and 1B). For ease of illustration and comprehension, FIGS. 1A and 1B show only a single microcapsule forming the pixel defined by rear electrode 112, although in practice a large number (20 or more) microcapsules are normally used for each pixel. The rear electrodes 112 are mounted upon a substrate 114.

The capsules 104 and the particles 106 and 108 can be made in a wide range of sizes. However, in general it is preferred that the thickness of the capsules, measured perpendicular to the electrodes, be in the range of about 15 to 500 µm, while the particles 108 will typically have diameters in the range of about 0.25 to about 2 µm.

FIG. 1A shows the display 100 with the rear electrode 112 negatively charged and the front electrode 110 positively charged. Under this condition, the positively-charged particles 108 are attracted to the negative rear electrode 112 and thus lie adjacent the rear electrode 112, where they are hidden from an observer viewing the display 100 through the front electrode 110 by the white particles 106. Accordingly, the pixel shown in FIG. 1A displays to the observer the white color of the particles 106. (Although the display 100 is illustrated in FIGS. 1A and 1B with the rear electrodes 112 at the bottom, in practice both the front and rear electrodes are typically disposed vertically for maximum visibility of the display 100. None of the specific embodiments of the invention described herein rely in any way upon gravity to control the movement of the particles.)

FIG. 1B shows the display 100 with the front electrode 110 made negative relative to the rear electrode 112. Since the particles 108 are positively charged, they will be attracted to the negatively-charged front electrode 110, and thus the particles 108 move adjacent the front electrode 110, and the pixel displays the black color of the particles 108.

In FIGS. 1A and 1B, the capsules 104 are illustrated as being of substantially prismatic form, having a width (parallel to the planes of the electrodes) significantly greater than their height (perpendicular to these planes). This prismatic shape of the capsules 104 is deliberate. If the capsules 104 were essentially spherical, in the black state shown in FIG. 1B, the particles 108 would tend to gather in the highest part of the capsule, in a limited area centered directly above the center of the capsule. The color seen by the observer would then be essentially the average of this central black area and a white annulus surrounding this central area, where the white particles 106 would be visible. Thus, even in this supposedly black state, the observer would see a grayish color rather than a pure black, and the contrast between the two extreme optical states of the pixel would be correspondingly limited. In contrast, with the prismatic form of microcapsule shown in FIGS. 1A and 1B, the particles 108 cover essentially the entire cross-section of the capsule so that no, or at least very few white particles are visible, and the contrast between the extreme optical states of the capsule is enhanced. For further discussion on this point, and on the desirability of achieving close-packing of the capsules within the electrophoretic layer, the reader is referred to the aforementioned U.S. Pat. No. 6,067,185. Also, as described in the aforementioned E Ink and MIT patents and applications, to provide mechanical integrity to the electrophoretic medium, the microcapsules are normally embedded within a solid binder, but this binder is omitted from FIGS. 1A and 1B for ease of illustration.

It will be appreciated that, as discussed above, the discrete capsules and binder of the display 100 shown in FIGS. 1A and 1B could be replaced by a polymer dispersed system, using the same suspending gas, and particles 106 and 108, but with the capsule walls and the binder replaced by a single continuous, and typically polymeric phase, as described in the aforementioned 2002/0131147.

Figure 2:
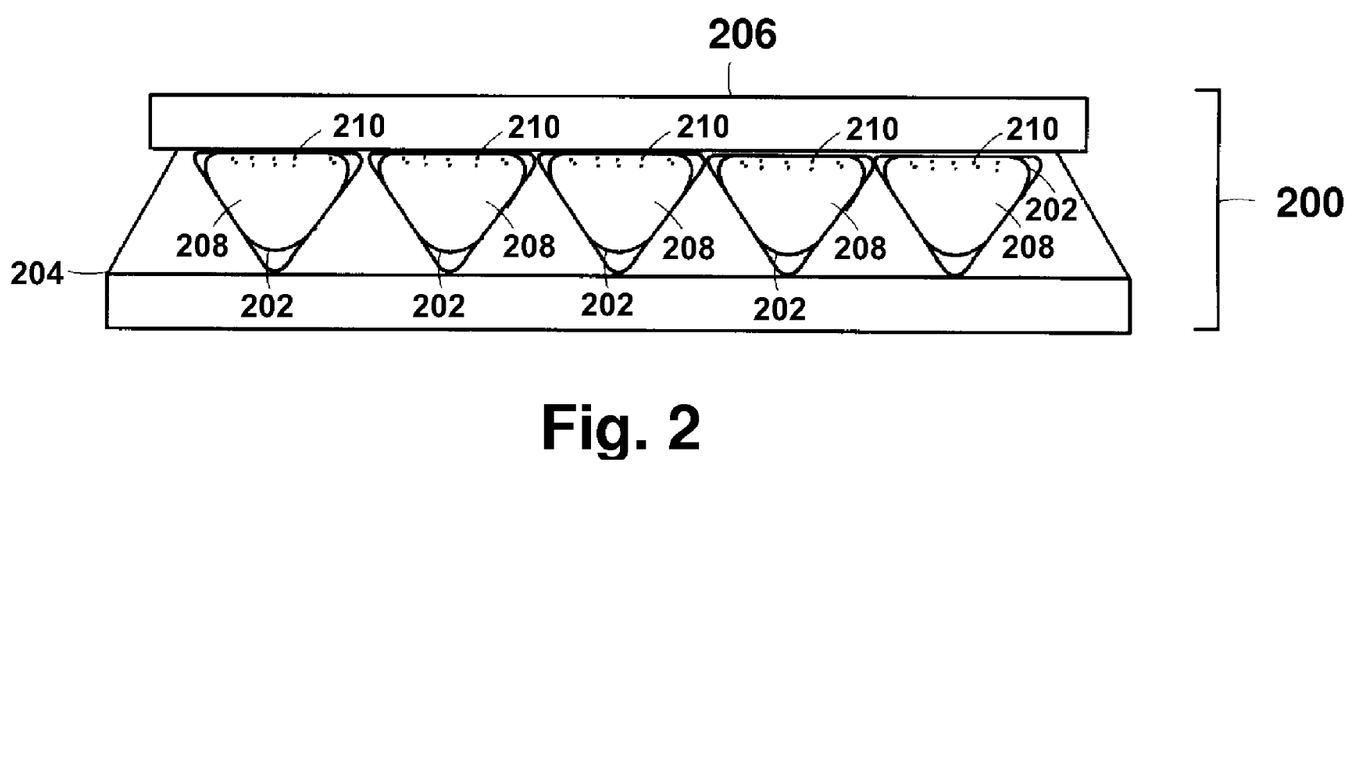
FIG. 2 is a schematic side elevation of a single particle electrophoretic medium of the present invention.
Figure 3A:
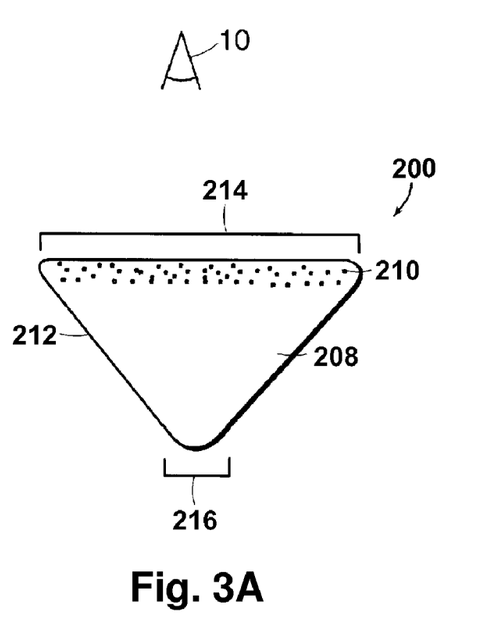
FIGS. 3A and 3B are schematic side elevations showing the two extreme optical states of one capsule of the single particle electrophoretic medium shown in FIG. 2.
Figure 3B:
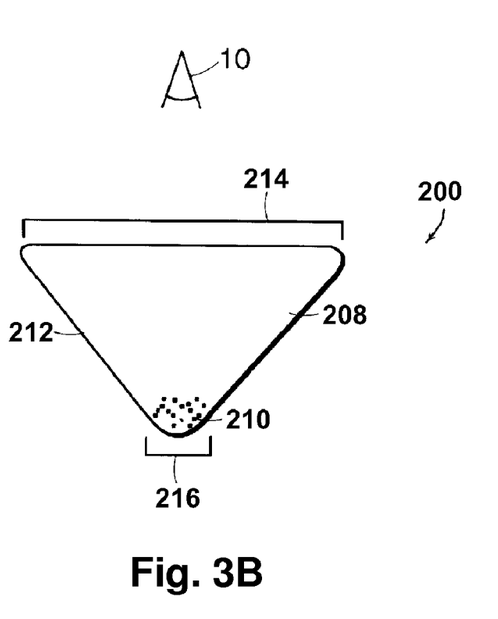

FIGS. 2 and 3 of the accompanying drawings illustrate an electrophoretic display (generally designated 200) of the present invention which is of the type described in the aforementioned U.S. Pat. Nos. 6,130,774 and 6,172,798; FIG. 2 shows the overall architecture of the display 200, while FIGS. 3A and 3B illustrate the two extreme optical states of a single capsule 202 thereof.

FIG. 2 is a schematic side elevation of the second electrophoretic display 200, which operates in a so-called "shutter mode" in which individual pixels of the display can be either light transmissive or light blocking. The electrophoretic display 200 comprises a first substrate 204 that forms a number of cavities which, in the display 200, have the form of triangular prisms. The first substrate 204 can be patterned by etching, by micromachining, or by embossing using a suitable embossing die or by other pressure or thermal processes. Alternatively, the cavities could have the form of conical or pyramidal depressions. A second substrate 206 may be attached to the first substrate to close each of the cavities. Electrodes (not shown) are provided on the substrates 204 and 206 to enable an electric field to be applied across the capsules 202, in the same manner as described above with reference to FIGS. 1A and 1B.

FIG. 3A is an enlarged schematic side elevation of one of capsules 202 shown in FIG. 2 in its light-blocking configuration. The capsule 202 contains a suspending gas 208 and a plurality of electrically charged particles 210 surrounded by a capsule wall 212. The capsule 202 has a first, larger surface 214 and a second, smaller surface 216. In FIG. 3A, the capsule is shown after it has been subjected to a first electric field of such an orientation and strength that the particles 210 migrate towards the larger surface 214, substantially blocking light from passing through the capsule 202 since the particles 210 are substantially opaque. For example, if the particles 210 have a positive charge, the particles will migrate towards the larger surface 214 when an electric field having an electric vector with a positive gradient extending substantially from the larger surface 214 to the smaller surface 216 is applied, that is, an electric field is applied which has a more negative voltage at the larger surface 214 and a more positive voltage at the smaller surface 216. In the condition shown in FIG. 3A, the capsule 202 would appear to a viewer 10 to have the optical property or properties of the particles 210. For example, the particles 210 may be colored so that in FIG. 3A the capsule 202 would exhibit the color of the particles 210. Alternatively, the particles 210 could be reflective, so that in FIG. 3A the capsule 202 would appear reflective.

FIG. 3B is an enlarged schematic side elevation similar to that of FIG. 3A but depicts the capsule 202 in its light-transmissive configuration, after the capsule 202 has been subjected to a second electric field of such an orientation and strength that the particles 210 migrates towards the smaller surface 216, allowing light to pass through the microcapsule 202 because the particles are concentrated in a vary small area of the capsule. In the configuration shown in FIG. 3B, the capsule 202 appears to the viewer 10 to have the optical property or properties of the suspending gas 208, which would normally be transparent, so that the capsule would act as a light valve, shifting between a transparent state shown in FIG. 3B and a colored (and typically black) state shown in FIG. 3A. In such a light valve embodiment, the substrates 204 and 206 would normally be made transparent, or at least light-transmissive. Alternatively, one of the substrates might be colored, or a colored layer be provided adjacent one of the substrates; the colored layer might be either light-transmissive or opaque, but in the latter case it would have to be provided at or adjacent the substrate 204, i.e. on the opposed side of the capsules 202 from the observer 10. When such a colored layer is provided, the capsule 202 can be shifted from the state shown in FIG. 3A, which displays the color of the particles 210 (or a combination of this color and that of the colored layer, if the colored layer is between the capsules 202 and the observer 10) to the state shown in FIG. 3B, which displays the color of the colored layer.

It will readily be apparent to those skilled in electrophoretic display technology that numerous changes and modifications can be made in the specific embodiments described above without departing from the scope of the present invention. Accordingly, the whole of the foregoing description is to be construed in an illustrative and not in a limitative sense.

The invention claimed is:

1. An electrophoretic medium comprising a plurality of capsules, each capsule comprising an internal phase comprising a plurality of electrophoretically mobile particles in a gaseous suspending medium, and a capsule wall surrounding the internal phase.

2. An electrophoretic medium according to claim 1 wherein each capsule comprises a single type of electrophoretically mobile particle, each capsule having a pair of substantially planar opposed surfaces differing in area.

3. An electrophoretic medium according to claim 1 comprising two types of particles having differing optical characteristics and differing electrophoretic mobilities.

4. An electrophoretic medium according to claim 3 wherein one type of particle has substantially zero electrophoretic mobility.

5. An electrophoretic medium according to claim 3 wherein the two types of particles bear charges of the same polarity but differ in electrophoretic mobility.

6. An electrophoretic medium according to claim 1 wherein the medium comprises a plurality of bubbles, each containing the electrophoretically mobile particles and the gaseous suspending medium, the bubbles being dispersed in a continuous solid phase.

7. An electrophoretic medium according to claim 1 wherein the gaseous suspending medium comprises carbon dioxide.

8. An electrophoretic display comprising an electrophoretic medium according to claim 1 and at least one electrode disposed adjacent the electrophoretic medium and arranged to apply an electric field to the medium.

* * * * *